(12) United States Patent
Nguyen et al.

(10) Patent No.: US 10,951,546 B2
(45) Date of Patent: Mar. 16, 2021

(54) MANAGING VIRTUAL OUTPUT QUEUES

(71) Applicant: Cisco Technology, Inc., San Jose, CA (US)

(72) Inventors: Dennis Khoa Dang Nguyen, San Jose, CA (US); Sha Ma, Palo Alto, CA (US); Thomas J. Edsall, Los Gatos, CA (US); Keerthi Manjunathan Swarnamanjunathan, Milpitas, CA (US); Parvin Taheri, Mountain View, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 12 days.

(21) Appl. No.: 16/503,843

(22) Filed: Jul. 5, 2019

(65) Prior Publication Data
US 2021/0006509 A1    Jan. 7, 2021

(51) Int. Cl.
| H04J 1/16 | (2006.01) |
| H04L 12/935 | (2013.01) |
| H04L 12/927 | (2013.01) |
| H04L 12/867 | (2013.01) |
| H04L 12/863 | (2013.01) |

(52) U.S. Cl.
CPC ........ H04L 49/3045 (2013.01); H04L 47/621 (2013.01); H04L 47/629 (2013.01); H04L 47/805 (2013.01); H04L 49/3027 (2013.01)

(58) Field of Classification Search
None
See application file for complete search history.

(56) References Cited

U.S. PATENT DOCUMENTS

| 7,539,143 B2 * | 5/2009 | Moores .................. H04L 47/20 370/235.1 |
| 8,184,540 B1 * | 5/2012 | Perla, Sr. ............. H04L 47/568 370/235 |
| 8,264,957 B1 * | 9/2012 | Charny .................. H04L 47/26 370/230 |

(Continued)

OTHER PUBLICATIONS

"Cisco Nexus 5000 Series Architecture: The Building Blocks of the Unified Fabric", 2009 Cisco Systems, Inc. This document is Cisco Public Information., 17 pages.

(Continued)

*Primary Examiner* — Sithu Ko
(74) *Attorney, Agent, or Firm* — Johnson, Marcou, Isaacs & Nix, LLC (57) ABSTRACT

A first node of a packet switched network transmits at least one flow of protocol data units of a network to at least one output context of one of a plurality of second nodes of the network. The first node includes X virtual output queues (VOQs). The first node receives, from at least one of the second nodes, at least one fair rate record. Each fair rate record corresponds to a particular second node output context and describes a recommended rate of flow to the particular output context. The first node allocates up to X of the VOQs among flows corresponding to i) currently allocated VOQs, and ii) the flows corresponding to the received fair rate records. The first node operates each allocated VOQ according to the corresponding recommended rate of flow until a deallocation condition obtains for the each allocated VOQ.

19 Claims, 9 Drawing Sheets

(56) References Cited

U.S. PATENT DOCUMENTS

| | | | | |
|---|---|---|---|---|
| 8,797,877 B1* | 8/2014 | Perla, Sr. | ............... | H04L 49/90 |
| | | | | 370/235 |
| 10,721,187 B1* | 7/2020 | Goldman | ............. | H04L 49/206 |
| 2003/0058802 A1* | 3/2003 | Jones | ..................... | H04L 47/10 |
| | | | | 370/252 |
| 2004/0013124 A1* | 1/2004 | Peebles | .................. | H04L 47/30 |
| | | | | 370/412 |
| 2006/0203826 A1* | 9/2006 | Cho | ....................... | H04L 47/10 |
| | | | | 370/395.53 |
| 2009/0003212 A1* | 1/2009 | Kwan | .................. | H04L 49/508 |
| | | | | 370/235 |
| 2013/0329577 A1* | 12/2013 | Suzuki | ................. | H04L 49/552 |
| | | | | 370/252 |
| 2018/0287953 A1* | 10/2018 | Cheng | ................ | H04L 49/9036 |

OTHER PUBLICATIONS

"Cisco Nexus 9500 Cloud Scale Line Cards and Fabric Modules", 2018 Cisco and/or its affiliates. This document is Cisco Public Information., 2018, 23 pages.

"Priority Flow Control: Build Reliable Layer 2 Infrastructure", 2015 Cisco Systems, Inc. This document is Cisco Public Information, 8 pages.

* cited by examiner

Receiving, in a first node of a packet switched network comprising $X$ virtual output queues (VOQs), from at least one second node of the network, at least one fair rate record, each fair rate record corresponding to a particular second node output context and describing a recommended rate of flow to the particular output context
310

Allocating, by the first node, up to $X$ of the VOQs among flows corresponding to i) currently allocated VOQs, and ii) the flows corresponding to the received fair rate records
315

Operating, by the first node, each allocated VOQ according to the corresponding recommended rate of flow until a deallocation condition obtains for the each allocated VOQ
320

```
┌─────────────────────────────────┐     ┌─────────────────────────────────┐
│ Receiving, in a first node of a │     │                                 │
│ packet switched network         │     │                                 │
│ comprising X virtual output     │     │ Determining, by the first node, │
│ queues (VOQs), from at least    │     │ a reception rate for each flow  │
│ one second node of the network, │     │ received by the first node,     │
│ at least one fair rate record,  │     │              610                │
│ each fair rate record           │     │                                 │
│ corresponding to a particular   │     └─────────────────────────────────┘
│ second node output context and  │
│ describing a recommended rate   │
│ of flow to the particular       │
│ output context                  │
│              310                │
└─────────────────────────────────┘
```

Allocating, by the first node, up to $X$ of the VOQs among flows corresponding to i) currently allocated VOQs, and ii) the flows corresponding to the received fair rate records; including comparing the determined reception rate for the particular flow to the recommended rate for the particular flow, and allocating a VOQ to the particular flow only if the recommended rate exceeds the determined reception rate by a second predetermined threshold
615

Operating, by the first node, each allocated VOQ according to the corresponding recommended rate of flow until a deallocation condition obtains for the each allocated VOQ
320

MANAGING VIRTUAL OUTPUT QUEUES

TECHNICAL FIELD

The disclosed technology relates to computer network operation. Particular examples disclosed herein relate to managing queues of protocol data units (PDUs) in packet switching computer networks.

BACKGROUND

Figure 1:
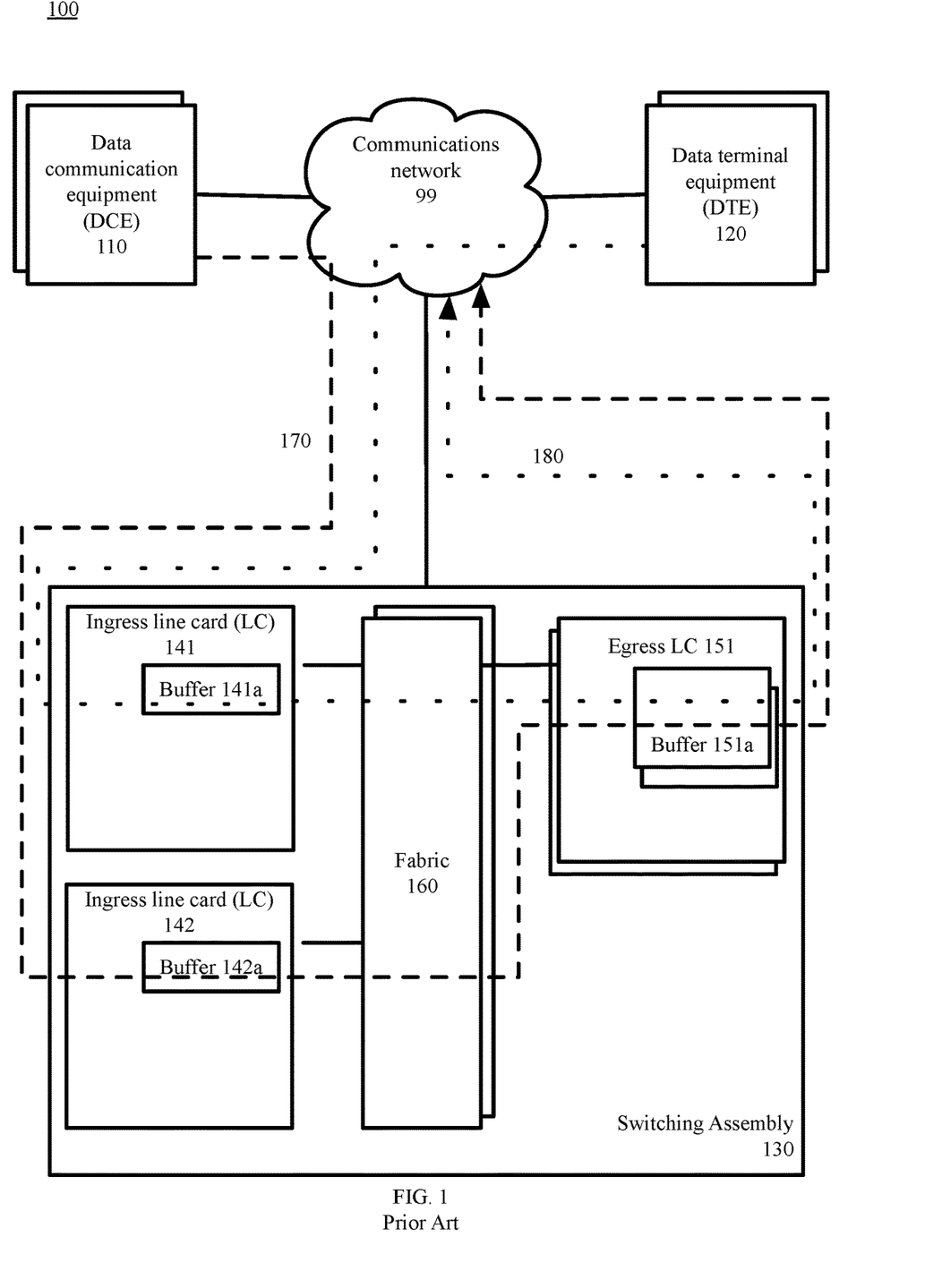
FIG. 1 is a block diagram depicting a notional computer networking architecture, in which the technology disclosed herein operates.

Referring to FIG. 1, a notional computer networking architecture 100, in which the technology disclosed herein can operate, is illustrated. In a typical computer network, a network "node" is either data communication equipment (DCE) 110 or data terminal equipment (DTE) 120. Example DCEs 110 include, but are not limited to, routers, switches, and bridges. Example DTEs 120 include, but are not limited to, host computers and peripherals, such as printers. In a network, nodes are connected by a transmission medium, for example wired or wireless, and other elements of a communications network 99. Both the Open Systems Interconnection (OSI) reference model and the Internet protocol suite (more commonly known as "TCP/IP" for two of the protocols in the suite) model computer networking with a hierarchy of layers of increasing abstraction—from lower layers closest to the transmission medium between nodes, to higher layers closest to any applications running on the node. Each layer supports the layers above it and is supported by the layers below it.

A modular switch 130, also referred to as a switching assembly, is a type of DCE built on a chassis. The chassis provides power for, and communication between, line cards (alternatively herein "LCs") 141, 142, 151 that interface with the rest of the architecture 100 and fabric modules 160 (alternatively herein "FMs," and collectively "the fabric") that switch packets between line cards. Data flow 170, 180—for example, a collection of PDUs such as packets or frames with a common source and destination indicated in each PDU—can typically traverse the switch 130 via network 99 from a source in the architecture 100 via a network-facing port on an LC (hereinafter referred to as the "ingress" port for the flows 170 and 180 or the "ingress" LC for the flows 170 and 180, for example LC 141 and 142), through a FM-facing port on the ingress LC, via the FMs 160, to an FM-facing port on an "egress" LC (for example Egress LC 151), and out a network-facing "egress" port on the egress LC 151 to the PDU's destination in the architecture 100. In the present disclosure, for simplicity of explanation, LCs 141 and 142 are described as ingress LCs, while LC 151 is described as an egress LC. The FMs 160 are operative to switch each PDU from an ingress LC output port to an egress LC input port consistent with the PDU characteristics, which characteristics can include destination and class of service. In some instances, a single LC can host both an ingress port and an egress port for a given flow. In general, "ingress" and "egress" describe the state of a card, module, or port thereon, with respect to a PDU data flow.

Switches 130 can be described as operating at Layer 2, or at Layer 3, or a combination thereof. At Layer 2, corresponding to the data link layer in the OSI reference model, the PDU is a "frame" containing a media access control (MAC) address. At Layer 3, corresponding to the network layer in the OSI reference model, the PDU is the "packet" with an Internet Protocol (IP) destination address. Hereinafter, for simplicity of explanation, the PDU will be referred to as "packet" regardless of protocol layer.

Each ingress LC 141, 142, egress LC 151, and FM 160 in a modular switch 130 may operate as a switch—with its own MAC address and IP address as a network node. A typical ingress LC 141, 142, egress LC 151, and FM 160 contains one or more buffers such as 141a, 142a, 151a associated with ports of the card/module. A buffer may be used to compensate for a difference in rate of flow of data between nodes when transferring data from point to another. Buffers are used for many purposes, including, but not limited to, interconnecting two nodes operating at different rates, allowing timing corrections to be made on a packet stream, and delaying the transit time of a packet in order to allow other operations to occur.

DETAILED DESCRIPTION OF EXAMPLE EMBODIMENTS

A network operator may choose to operate a modular switch 130, such as an Ethernet switch, using a process such as Institute of Electrical and Electronics Engineers (IEEE) 802.3x PAUSE or IEEE 802.1Qbb Priority Flow Control (PFC) to manage packet drops due to buffer overflow. In PAUSE and PFC, nodes (for example, any one of 110, 120, 141, 142, 151, and 160) send flow control signals to each other. A node with a rapidly filling buffer may request that that node's link partners (other nodes) stop sending packets, thereby giving the node sending the PAUSE or PFC time to make room in its buffer by processing the packets already in its buffer(s).

For example, and continuing to refer to FIG. 1, consider an output port of egress LC 151 of modular switch 130 operating in Layer 3 and receiving packets in flows from multiple ingress line cards 141 (flow 180) and 142 (flow 170) via the fabric 160. If the egress card 151 output port receives packets faster than the card 151 can send them out, then buffer 151a begins to fill and crosses a threshold, prompting the egress card 151 to send PAUSE signals to the fabric cards 160. This could cause the fabric card output buffers (not shown in FIG. 1) that were transmitting packets to egress card 151 to fill, which could prompt each fabric card 160 to send PAUSE signals to the ingress cards 141-142 that were transmitting packets destined for egress card 151. Now the buffers 141*a*-142*a* on ingress cards 141-142 begin to fill, which could cause the ingress cards 141-142 to send PAUSE signals over network 99 to the nodes that were supplying the ingress cards 141-142 with packets intended for egress card 151. In such a scenario, congestion propagates through several flows, even those that may have been otherwise well-behaved and not congested.

Although a correctly configured node can prevent packet drops using PAUSE and PFC, the approach described above tends to restrict an overbroad scope of flows. A line card with a filling buffer will tend to PAUSE its upstream link partners, even link partners that are not the source of the congestion that prompted the PAUSE. Congestion in the fabric 160 can congest entire portions of the modular switch 130.

One approach to reducing the likelihood of head of line blocking is to give the ingress line cards 141-142 awareness of output contexts, where "output context" includes a collection of characteristics of a given buffer on a port of a line card. For example, if an output context of a given egress line card 151 experiences congestion, the egress line card 151 can send a signal to the ingress line cards 141-142, requesting that the ingress line cards 141-142 limit the rate of packet traffic into the fabric 160 intended for the that output context. The ingress line cards 141-142 each place the flow of packet traffic intended for the particular egress line card 151 context into a special queue on ingress, and apply a rate shaper to the queue (that is, control the rate of transmission from the queue over time). This special queue is a Virtual Output Queue (VOQ) in each ingress line card 141-142 sending packets to the egress line card 151 output context. This solution allows the switch 130 to control flow traffic with greater specificity than either PAUSE or PFC, and reduces the likelihood that problematic flows of packets will overwhelm the fabric 160—in part by allowing the ingress line card 141-142 to perform arbitration and scheduling between the VOQs.

However, there are many output contexts in a given modular switch 130. A typical modular switch 130 may have a dozen line cards, with dozens of front panel ports each, and more than one no-drop queues per port. Such a switch 130 has over 500 egress ports, with over a thousand no-drop queues. It can be prohibitively expensive, from a processing standpoint, scaling standpoint, and a latency standpoint, for the ingress line cards 141-142 to implement a VOQ for each of these output contexts.

The technology disclosed herein provides computer-implemented methods, systems, and computer program products to manage VOQs. In some examples, a first node of a packet switched network transmits at least one flow of protocol data units of a network to at least one output context of one of a plurality of second nodes of the network. The first node includes X virtual output queues (VOQs). The first node receives, from at least one of the second nodes, at least one fair rate record. Each fair rate record corresponds to a particular second node output context and describes a recommended rate of flow to the particular output context. The first node allocates up to X of the VOQs among flows corresponding to i) currently allocated VOQs, and ii) the flows corresponding to the received fair rate records. The first node operates each allocated VOQ according to the corresponding recommended rate of flow until a deallocation condition obtains for the each allocated VOQ.

In some examples, the first node prioritizes the flows corresponding to each currently allocated VOQ and each received fair rate record. In such examples, the first node maintains each currently allocated VOQ corresponding to a flow prioritized as X or higher; and allocates a VOQ corresponding to each received fair rate record flow prioritized as X or higher.

In some examples, operating each allocated VOQ includes the first node periodically increasing the transmission rate of a particular allocated VOQ. In such examples, the deallocation condition for the particular VOQ obtains upon the transmission rate for particular VOQ exceeding a predetermined threshold.

In some examples, the first node determines a reception rate for each flow received by the first node. In such examples, allocating a VOQ to a particular flow includes comparing the determined reception rate for the particular flow to the recommended rate for the particular flow, and allocating a VOQ to the particular flow only if the recommended rate exceeds the determined reception rate by a second predetermined threshold.

In some examples, the fair rate record is included in a PDU comprising a plurality of fair rate records. In such examples the PDU is addressed to a plurality of nodes of the network including the first node. In such examples, the first node identifies each flow received by the first node, and then allocates a VOQ to a particular flow only if the particular flow is a flow that has been identified as being received by the first node.

By using and relying on the methods and systems described herein, the technology disclosed herein provides for flow-specific control at a first node of data flows contributing to congestion of a given output context of another node in a computer network. As such, the technologies described herein may be employed to improve computer network operation by mitigating the propagation of congestion across flows.

These and other aspects, objects, features, and advantages of the example embodiments will become apparent to those having ordinary skill in the art upon consideration of the following detailed description of illustrated example embodiments. Turning now to the drawings, in which like numerals represent like (but not necessarily identical) elements throughout the figures, example embodiments are described in detail.

Example System Architectures

In example architectures for the technology, while some items (such as servers, systems, and devices) shown in the architecture may be represented by one instance of the server, system, or device, multiple instances of each can be used. Further, while certain aspects of operation of the technology are presented in examples related to the figures to facilitate enablement of the claimed invention, additional features of the technology, also facilitating enablement of the claimed invention, are disclosed elsewhere herein.

Figure 2:
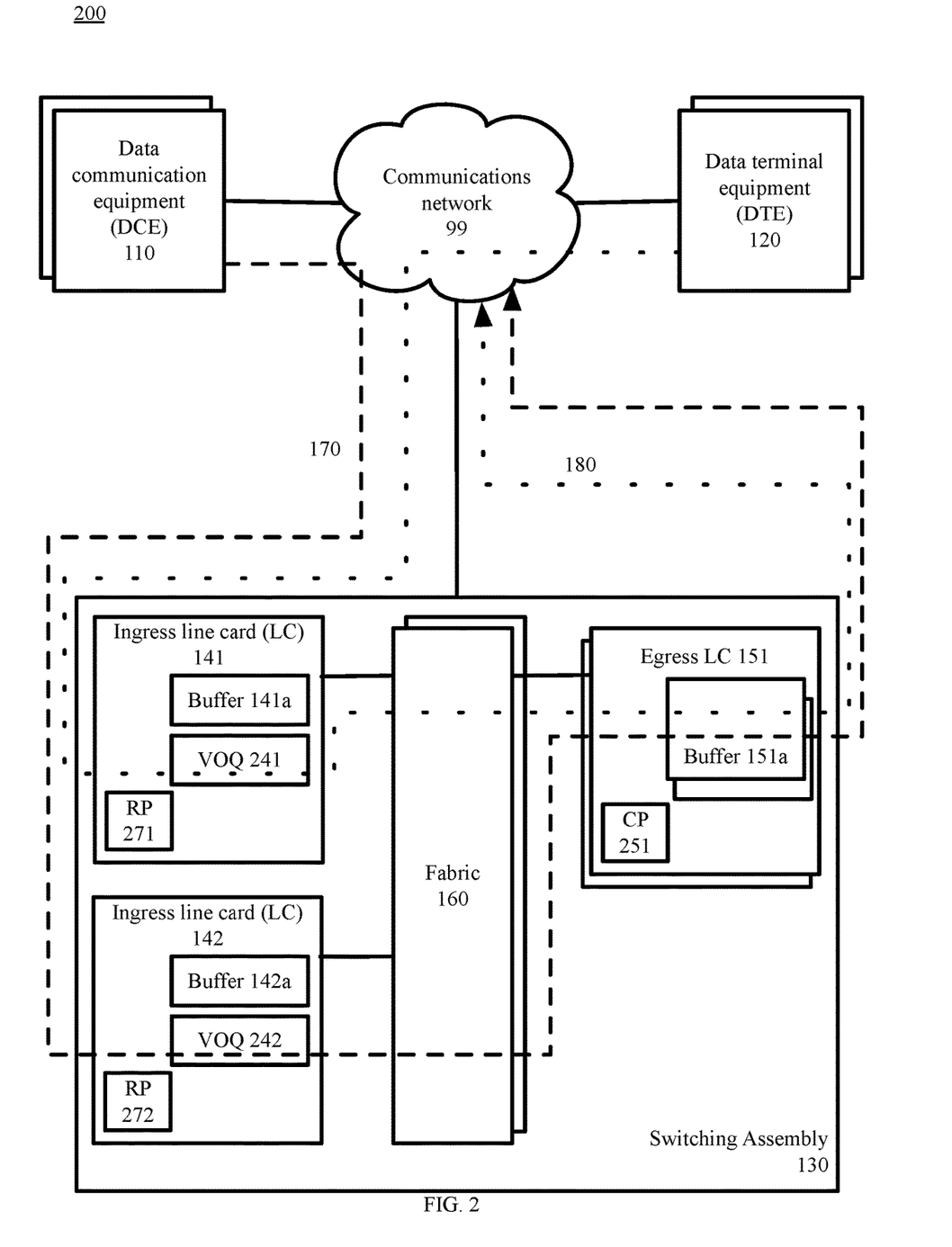
FIG. 2 is a block diagram depicting a notional computer networking architecture to manage virtual output queues (VOQs), in accordance with certain examples of the technology disclosed herein.

FIG. 2 is a block diagram depicting a communications and processing architecture 200 to manage virtual output queues, in accordance with some examples of the technology disclosed herein. While each element shown in the architecture is represented by one instance of the element, multiple instances of each can be used. Further, while certain aspects of operation of the present technology are presented in examples related to FIG. 1 and FIG. 2 to facilitate enablement of the claimed invention, additional features of the present technology, also facilitating enablement of the claimed invention, are disclosed elsewhere herein.

As depicted in FIG. 2, in addition to the features describe in conjunction with FIG. 1, the architecture 200 includes one or more congestion point (CP) processes 251, each in an egress LC 151. The architecture 200 includes one or more reaction point (RP) processes 271-272, each in an ingress LC 141-142, and at least one VOQ, for example, 241, per each ingress LC. In practice, each LC will include both a CP 251 (for flows for which the LC is the egress card) and an RP 271 (for flows for which the LC is the ingress card).

Further network 99 includes one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, any combination thereof, and any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment. While network 99 can include data communication technologies that are not based on switching PDUs, where the network 99 interfaces with the modular switch 130 it is a PDU-switching network.

The network connections illustrated are examples and other approaches for establishing a communications link between the computers and devices can be used. Additionally, those having ordinary skill in the art and having the benefit of this disclosure will appreciate that the network devices illustrated in the figures may have any of several other suitable computer system configurations, and may not include all the components described above.

Figure 9:
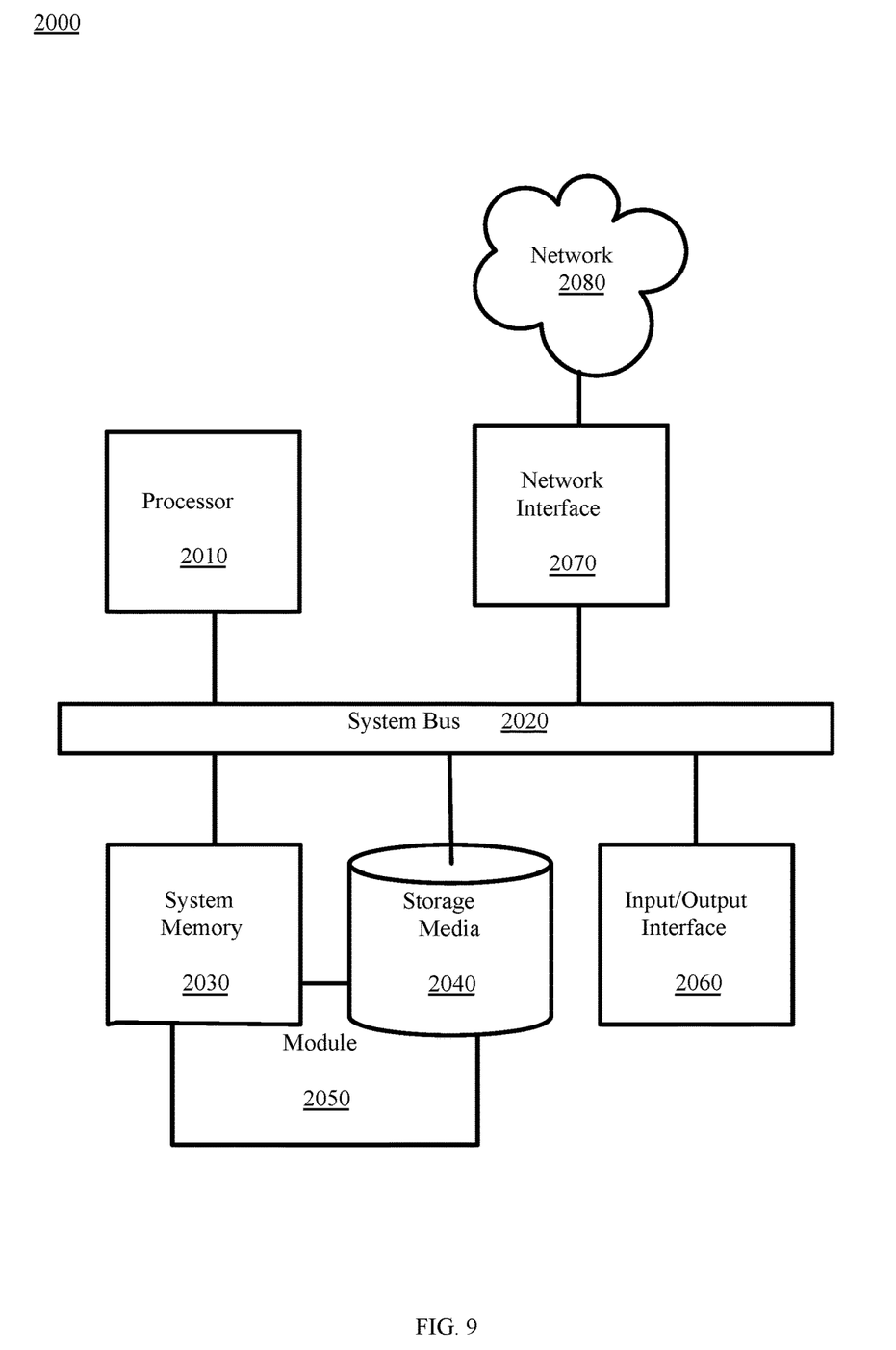
FIG. 9 is a diagram depicting a computing machine and a module, in accordance with certain example embodiments.

In example embodiments, the network computing devices, and any other computing machines associated with the technology presented herein, may be any type of computing machine such as, but not limited to, those discussed in more detail with respect to FIG. 9. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 9. The computing machines discussed herein may communicate with one another, as well as with other computing machines or communication systems over one or more networks, such as network 99. Each network may include various types of data or communications network, including any of the network technology discussed with respect to FIG. 9.

Example Embodiments

The examples illustrated in the following figures are described hereinafter with respect to the components of the example operating environment and example architectures 100 and 200 described elsewhere herein. The example embodiments may also be practiced with other systems and in other environments. The operations described with respect to the example processes can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits. The operations described herein also can be implemented as executable logic that is encoded in one or more non-transitory tangible media for execution (e.g., programmable logic arrays or devices, field programmable gate arrays, programmable array logic, application specific integrated circuits, etc.).

Figure 3:
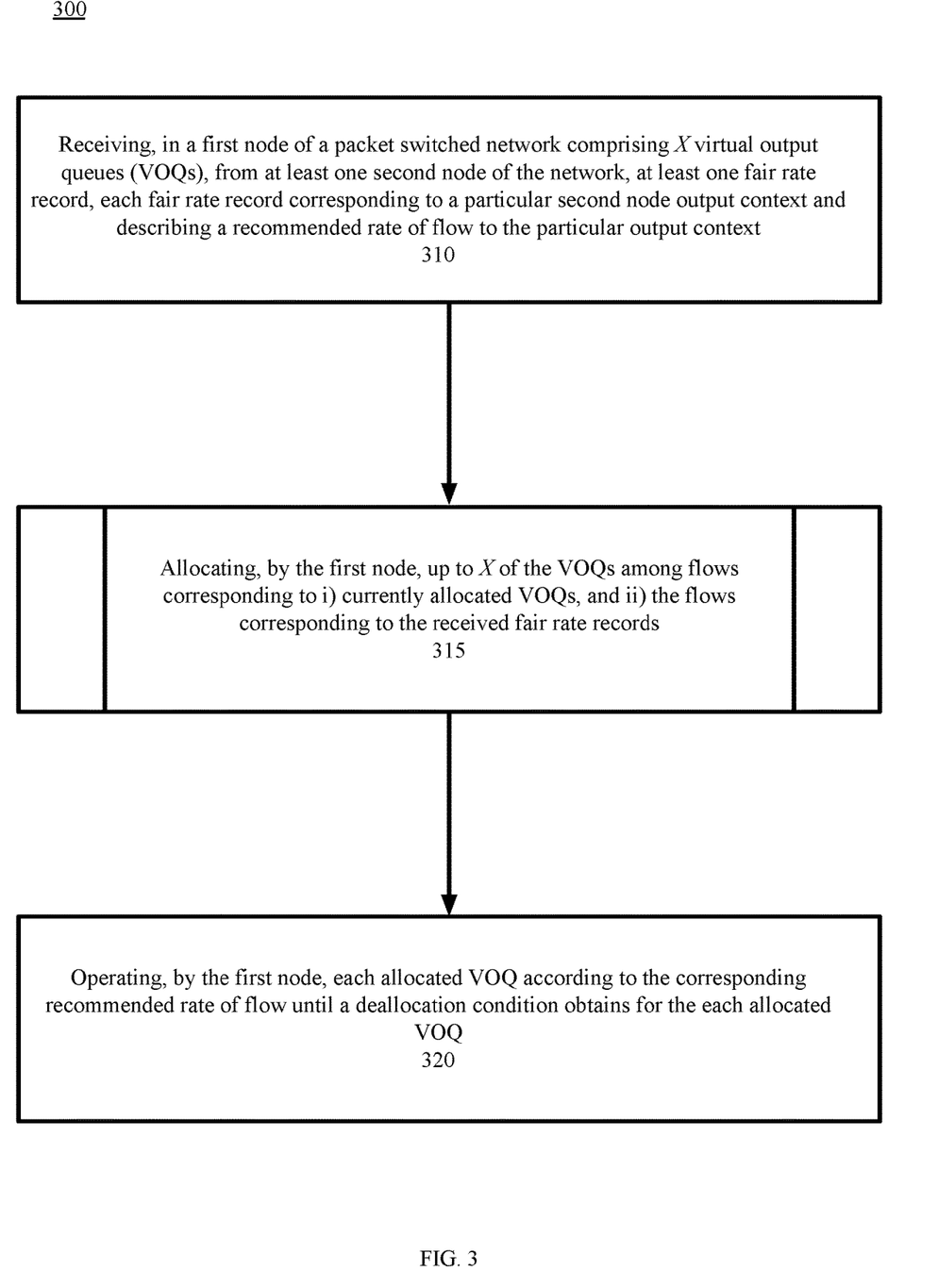
FIG. 3 is a block flow diagram depicting methods to manage VOQs, in accordance with certain examples of the technology disclosed herein.

Referring to FIG. 3, and continuing to refer to prior figures for context, a block flow diagram depicting methods 300 to manage virtual output queues are shown, in accordance with certain examples of the technology disclosed herein. In such methods, a first node of a packet switched network receives, from at least one second node of the network, at least one fair rate record—Block 310. Each fair rate record corresponds to a particular second node output context and describes a recommended rate of flow to the particular output context. The first node comprises X number of VOQs 241—a limited number when compared to the number of possible output contexts that may be the destination (at least intermediate) of a particular flow. Each VOQ 241 requires both memory and processing resources, and many of the possible output contexts may be infrequently targeted by flows transiting the first node.

Consider, as a continuing example, DCE switching assembly 130 with respect to flow 170. In this example, each of ingress LC 141 and LC 142 are first nodes (though the example will continue to refer only to LC 141, VOQ 241, and RP 271), and egress LC 151 is the second node. Ingress LC 141 has eight (8) VOQs 241.

Note that while the continuing example is described herein in the context of line cards and fabric modules of a modular switch assembly, the technology can find use across discrete standalone switches and across other network devices that employ queues for handling protocol data units such as packets.

In the continuing example a "congestion point" (CP 251) is a process running on egress LC 151—the second node. LC 151 contains a plurality of output buffers. The CP 251 is an embedded silicon-based process that tracks the occupancy characteristics of the LC 151 output buffers/queues such as buffer 151a. Based on a particular output queue's occupancy, and its rate of filling or emptying, the CP 251 periodically recomputes a fair rate for the flows, such as flow 180, transiting buffer 151a. One example of such a process is the Layer 3 Fair Congestion Notification (L3FCN) fair rate algorithm as described in commonly-owned U.S. Patent Application Publication 2019/0158415 A1 to Pan et al. ("PAN"), incorporated herein by reference in its entirety. L3FCN is used in the present continuing example.

In L3FCN, updating the fair rate for each flow contributing to an output context can include measuring a length of the output queue, computing a change in the length from a previous length, and computing a deviation of the length from the reference length; detecting an increase in the change in length above at least one threshold that is based on the reference length. If the increase is not above the at least one threshold indicative of a sudden and substantial increase in the change in length, the CP 251 can derive the fair rate from a previous fair rate using proportional integral control based on tunable control parameters, as described in PAN. If the increase is above the at least one threshold, the CP 251 can decrease the previous fair rate to the fair rate using multiplicative decrease control to accelerate convergence relative to the using the proportional integral control. The CP 251 can treat those flows that are disproportionately contributing to output context occupancy (referred to as "elephant" flows) differently than it treats flows contributing much less to output context occupancy (referred to as "mice" flows).

In the continuing example, once the CP 251 calculates a fair rate for each output context in the CP's 251 domain (for example all output contexts on LC 151), the CP 251 or another process on LC 151 collects each fair rate for one or more of the output contexts in its domain into a VOQ notification frame with a fair rate record for each output context. While in some examples, a separate fair rate record can be created specific to various flows contributing to the output context (for example, only elephant flows), in the continuing example a single fair rate record is formed for a given output context to be applied across all flows contributing to the output context. In the continuing example, the output context is given by the fair rate record, and is formed from the specific port identifier on LC 151 (7 bits) and the class of service (CoS) of PDUs in the flow 170 (4 bits). The fair rate itself (12 bits in units of 100 Mbps) completes the fair rate record for the output context. Further, in the continuing example, the "flow" can be defined by those packets having both a common modular switch output context, and a common modular switch input context.

Figure 4:
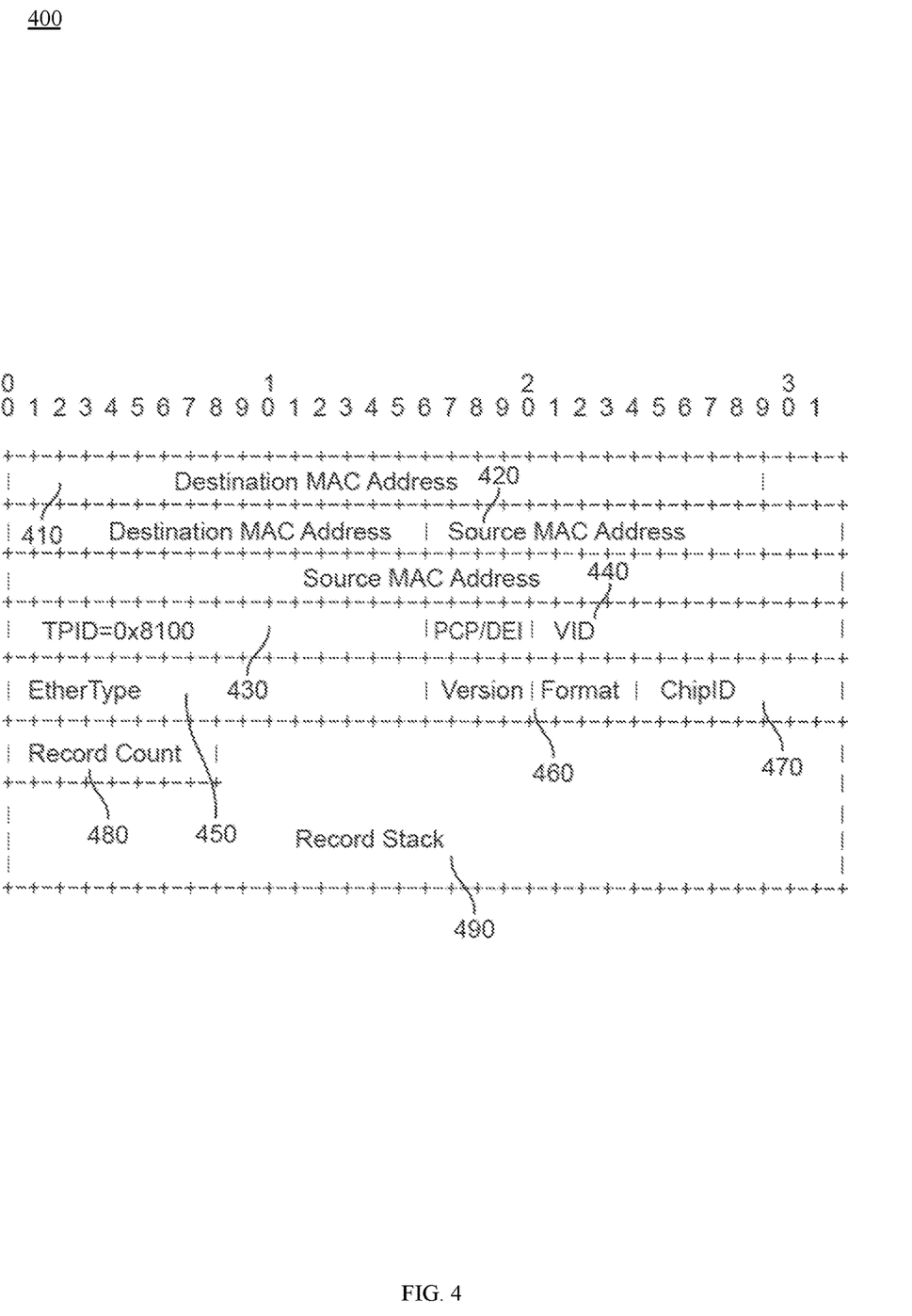
FIG. 4 is a diagram depicting a VOQ notification frame, in accordance with certain examples of the technology disclosed herein.

In the continuing example, the egress LC 151 (either through the CP 251 or some other process on the LC 151) forms one or more fair rate records into a VOQ notification frame. Referring to FIG. 4, and continuing to refer to prior figures for reference, an VOQ notification frame 400 of the continuing example is shown.

In the continuing example, the VOQ notification frame 400 Destination MAC Address 410 is a reserved 48-bit multicast address (bit 47 is set to "1") that is software configurable. A multicast address is useful in this example, in part because the fair rate records for all output contexts will be shared with each other LC in the assembly 130. In other cases, a unicast address can be used to reach a specific ingress destination, for example a specific ingress line card such as LC 141.

The Source MAC address 420 is the 48-bit MAC address of the CP's 251 LC 151, or in some cases, of the CP 251 itself. The Source MAC Address 420 is also software configurable, and can be used to mitigate the risk of attack by identifying what process determined the fair rate. The tag protocol identifier (TPID) is a 16-bit field set to a value of 0x8100 in order to identify the VOQ notification frame 400 as an IEEE 802.1Q-tagged frame. The TPID field can be used to distinguish the frame from untagged frames.

The Priority Code Point (PCP)/Drop Eligible Indicator (DEI) field 430 occupies four bits. The intent is to allow the fabric to deliver the VOQ notification frame 400 at the highest possible priority. In particular, PCP is a software-configurable 3-bit field which refers to the IEEE 802.1p class of service and maps to the frame priority level. Different PCP values can be used to prioritize different classes of traffic. The DEI is a 1-bit field used in conjunction with PCP to indicate frames eligible to be dropped in the presence of congestion. In the continuing example, DEI is "0," not drop eligible.

The Virtual Local Area Network Identifier (VID) 440 is a 12-bit software configurable value set to allows fan-out of the VOQ notification frame 400 to all ports including internal fabric ports. The 16-bit Ethernet Type ID 450 is a software programmed reserved value that identifies this PDU as an intra-chassis VOQ congestion notification frame. The version field and format field 460 are each 4-bit. The ChipID 470 is an 8-bit index of the CP 251 chip. In some implementations it corresponds to the port index in an internal fabric header applied by the ingress LC 141 before the PDU enters the fabric 160. The Record Count field is an 8-bit count of the fair rate records in the record stack 490. The record stack 490 contains each output context-specific fair rate record determined by the CP 251. A 4-byte cyclical redundancy check (CRC) is appended to the VOQ notification frame 400. Other forms of the VOQ notification frame 400, and other formats of individual fields, can be used.

In the continuing example, the CP 251 is implemented in silicon on the egress LC 151. A silicon implemented CP 251 can recalculate the fair rate for each output context in its domain on the order of microseconds. The CP's LC 151 can send the VOQ notification frame 400 back into the fabric 160 and on the other LCs 141 142 with similar frequency.

The approach described above for determining and distributing fair rate records has several advantages. In the continuing example, the network switching chip itself executes the CP 251 processing, and constructs the VOQ notification frame 400, as opposed to a software process. Having the chip itself execute CP 251 processing allows the device to readjust rates autonomously at intervals on the order of microseconds. A typical software-based solution would not be as capable of such rapid readjustment with equivalent precision or responsiveness, but could be useful in certain situations. The CP process 251 resides on a switch chip, as opposed to a network host. Prior congestion control mechanisms rely heavily on end hosts to modulate traffic. Although PAUSE and PFC also use silicon for generating flow control signals rapidly, such mechanisms signal for traffic to start and stop exclusively. The approach described above can specify and dynamically adjust rates based on current occupancy conditions. Such approaches are part of strategies to mitigate head of line blocking by decoupling pause generation from VOQ 241 installation—VOQs 241 are installed per output queues while pause is generated per input counters.

Continuing with FIG. 3, after receiving the VOQ notification frame 400 the first node allocates up to X of the VOQs 241 among flows corresponding to i) currently allocated VOQs 241, and ii) the flows corresponding to the received fair rate records—Block 315. In some examples of the present technology, the first node allocates a number of VOQs 241 less than or equal to the total number of VOQs 241 available in the first node.

In the continuing example, a "reaction point" (RP) process 271, running as an embedded silicon process (like the CP 251) on LC 141 (an ingress line card in the context of flow 180), manages VOQs 241. As described above, in the continuing example ingress LC 141 includes eight (8) VOQs 241. Prior to allocation to a flow, these VOQs 241 contain no packets. The unallocated VOQs 241 also do not initially correspond to any existing output contexts.

The RP 271 allocates the VOQs 241 on its LC 141 to flows transiting the LC in accordance with the fair rate records in the incoming VOQ notification frames 400. In the continuing example, the VOQ notification frame 400 from Block 310 includes a fair rate record corresponding to flow 180. Other fair rate records in the record stack of the VOQ notification frame 400 contain recommended rates for other flows headed toward other output contexts in the DCE assembly 130—for example the VOQ notification frame 400 includes a fair rate record corresponding to flow 170.

Figure 5:
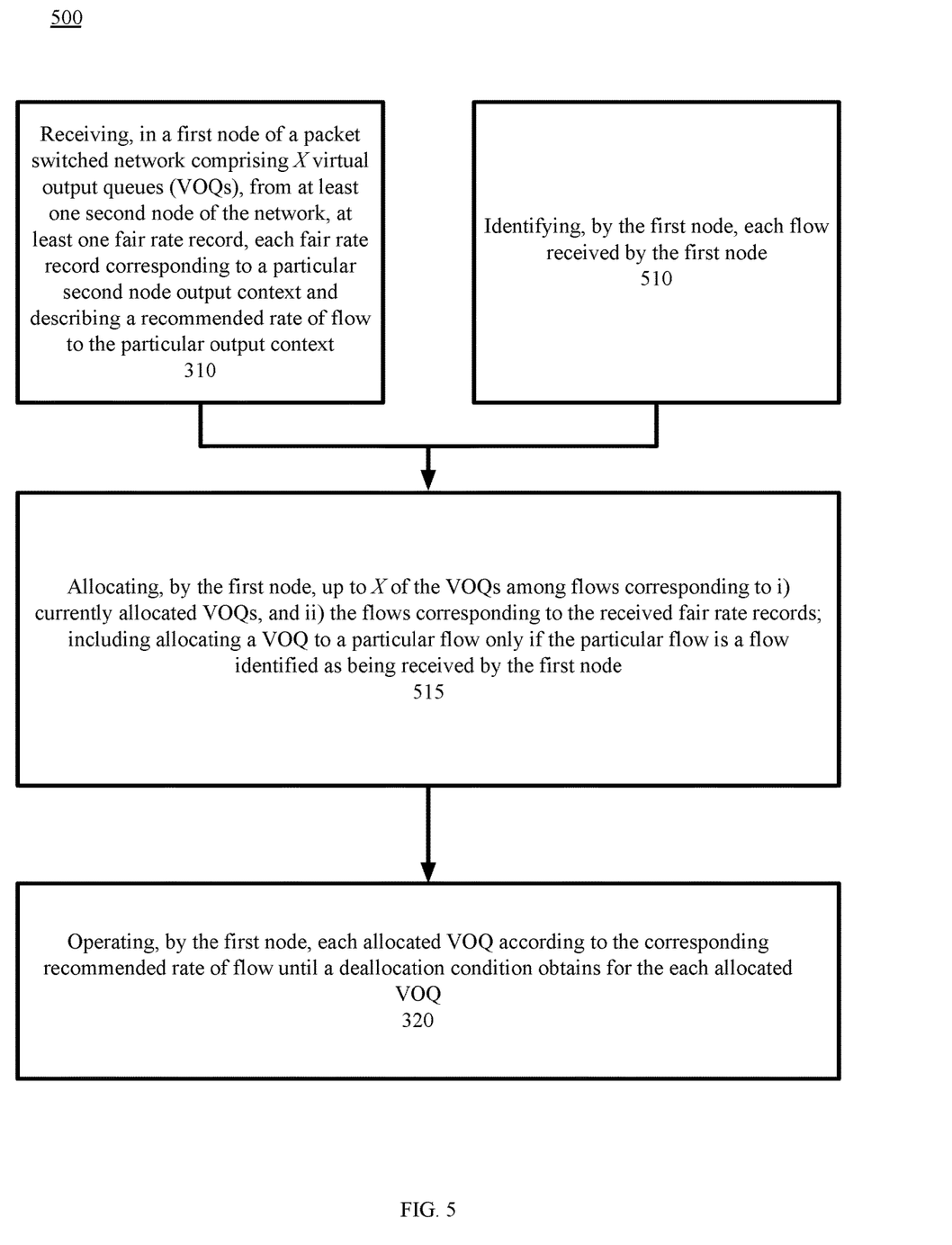
FIG. 5 is a block flow diagram depicting methods to manage VOQs, in accordance with certain examples of the technology disclosed herein.

Referring to FIG. 5, and continuing to refer to prior figures for context, methods 500 to manage virtual output queues are shown, in accordance with certain examples of the technology disclosed herein. In such methods, Block 310 (explained above) and Block 320 (explained below) operate as described elsewhere. In such methods, a first-level rough filter on RP 271 VOQ 241 allocation is whether the domain of the particular RP 271 (in the case of the continuing example, LC 141) has flow traffic relevant to the particular fair rate record. The RP 271, or the LC 141 itself, identifies each flow received by the LC 141—Block 510. A flow can be identified in various ways, but a common input context (e.g., a common source) and common output context is a simple and largely effective way to identify a flow of packets. In the continuing example, the first node allocates up to X of the VOQs among flows corresponding to i) currently allocated VOQs, and ii) the flows corresponding to the received fair rate records, by allocating a VOQ to a particular flow only if the particular flow is a flow identified as being received by the first node—Block 515.

In the continuing example, after the ingress LC 141 receives packets from connected hosts (including packets of flows 180 and 170), the LC 141 may perform forwarding operations on the packets, and encapsulate the packets in a fabric header. The fabric header contains an identifier for the destination egress LC, destination egress LC port, and destination class (collectively, the packet output context) to facilitate the packet's transit through the fabric 160. As the LC 141 sends these packets, the LC 141 maintains a recent record of the destinations to which it has sent packets. A VOQ filter of the RP 271 maintains this record. In some examples, the VOQ filter evicts entries beyond a certain age, in part to maintain temporal relevance of any entries. In some examples, entries are added to or deleted from the VOQ filter as an implementation of a network or device policy.

The RP 271 allocates the VOQs 241 in a manner that prevents re-ordering of packets in flows, as the targeted flows transition from the default queuing operation to VOQ operation. The RP 271 schedules the packets in the VOQs 241 in accordance with the fair rates specified in the VOQ notification frames 400. The RP 271 provides for deallocating the VOQ 241 (including flushing the VOQ 241), while also preventing re-ordering packets in the targeted flows. In the continuing example, flushing means allowing the VOQ 241 to empty at full rate so that once empty, the RP 271 de-allocates the VOQ 241. In addition, the RP 271 maintains a VOQ Content-Addressable Memory CAM, or other mechanism, to map a destination LC, port, and class combination to an internal VOQ index. This VOQ index denotes a physical VOQ 241 in a RP 271. Each VOQ 241 corresponds to a VOQ shaper of the RP 271, which enforces the rate specified by the fair rate record in the corresponding VOQ notification frame 400 as the LC 141 schedules the packets out of the VOQ 241. Finally, the VOQ 241 itself contains the sequence of packets corresponding to an installed destination, as well as the capability to enqueue and dequeue the relevant packets with the recommended fair rate performance.

In some examples, when a VOQ notification frame 400 arrives at the RP 271, the frame 400 contains a plurality of fair rate records, each indicating an output context with its calculated fair rate. The RP 271 processes these notifications—first through the VOQ filter, which ensures that the RP 271 only allocates a VOQs 241 for flows recently transiting the LC. Next the RP 271 passes through the VOQ CAM process, to check if the VOQ 241 is already installed, and then takes appropriate action. If the reaction point needs to install the VOQ 241, it must allocate a free VOQ 241 if one is available.

Figure 6:
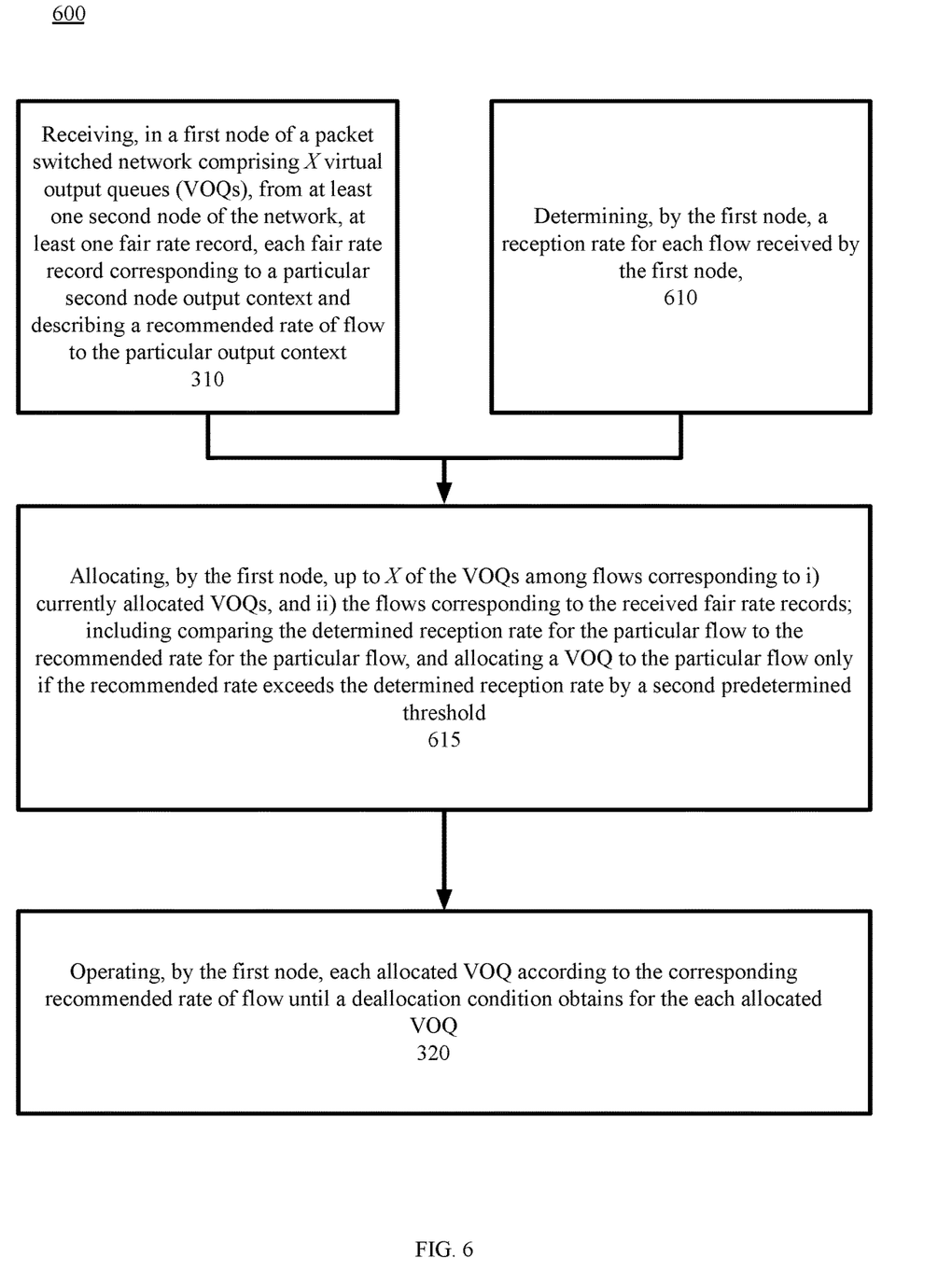
FIG. 6 is a block flow diagram depicting methods to manage VOQs, in accordance with certain examples of the technology disclosed herein.

Referring to FIG. 6 and continuing to refer to prior figures for context, methods 600 to manage VOQs are shown, in accordance with certain examples of the technology disclosed herein. In such methods, Block 310 and Block 320 remain as described elsewhere herein. In such methods, the first node determines a reception rate for each flow received by the first node—Block 610. In the continuing example, the RP 271 measures the rate of each incoming flow, for example, when performing forwarding operations and encapsulation on the incoming packets with a fabric 160 header.

Then, during allocation, the first node allocates up to X of the VOQs 241 among flows corresponding to i) currently allocated VOQs 241, and ii) the flows corresponding to the received fair rate records, in part by comparing the determined reception rate for the particular flow to the recommended fair rate for the particular flow, and allocating a VOQ 241 to the particular flow only if the recommended rate exceeds the determined reception rate by a second predetermined threshold—Block 615. In the continuing example, if the RP's 271 measurement of a particular flow's bandwidth falls below the particular flow's requested fair rate, the RP 271 does not allocate a VOQ 241 to the particular flow. In this simple case, a VOQ 241 allocated to the particular flow would not be acting to shape the flow anyway, since the flow's arrival rate is slower than the requested sending rate. In some examples, the RP 271 allocates a VOQ 241 to the particular flow only if the measured bandwidth exceeds the fair rate by a programmed additional threshold or percentage—including, in some cases, a negative threshold or a percentage less than 100%. In some examples, a process on the ingress LC 141 other than the RP 271 measures ingress flow bandwidth.

Figure 7:
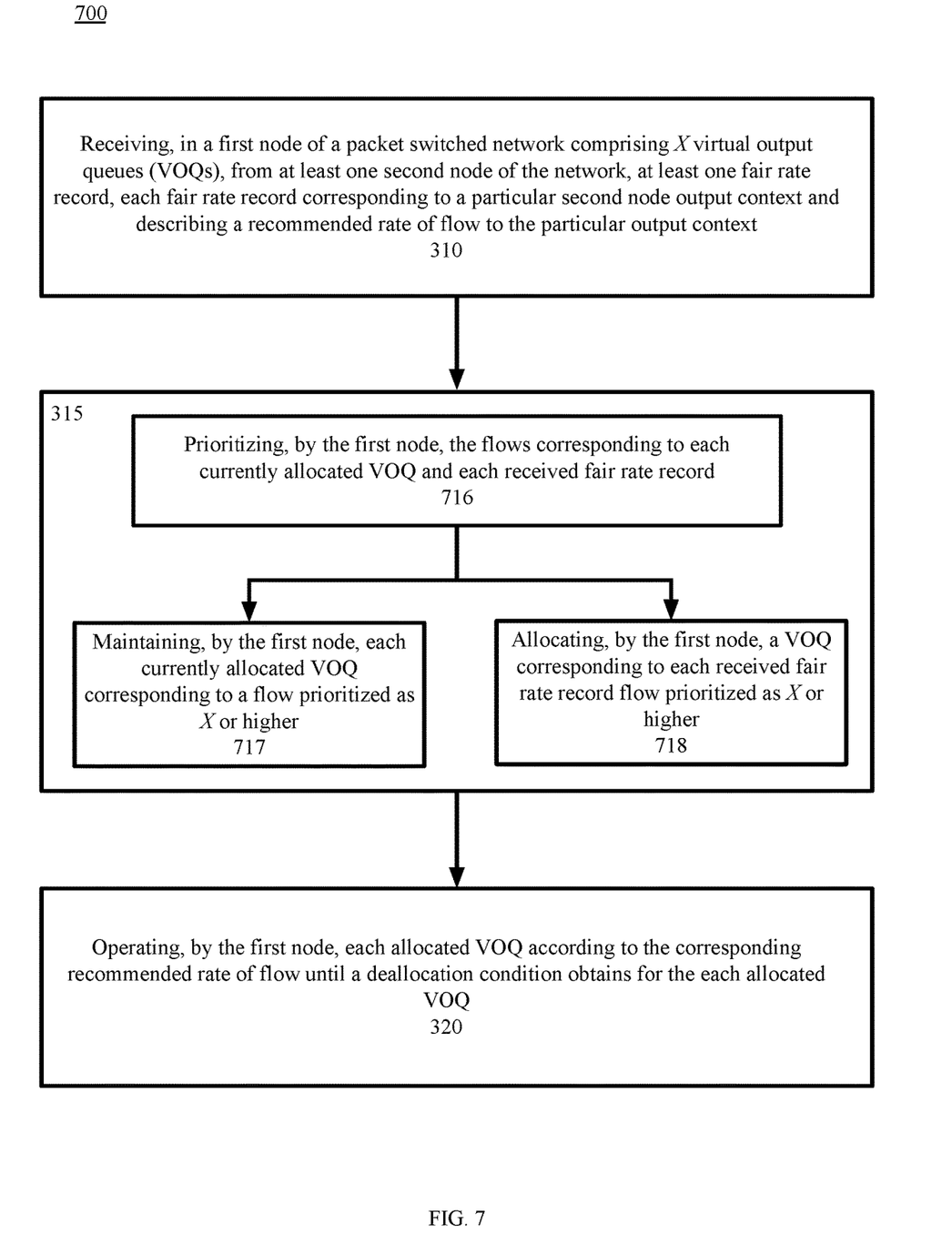
FIG. 7 is a block flow diagram depicting methods to manage VOQs, in accordance with certain examples of the technology disclosed herein.

Referring to FIG. 7 and continuing to refer to prior figures for context, methods 700 to manage VOQs are shown, in accordance with certain examples of the technology disclosed herein. In such methods, Block 310 and Block 320 remain as described elsewhere herein. In such methods, the first node prioritizes the flows corresponding to each currently allocated VOQ and each received fair rate record—Block 716. In the continuing example, the RP 271 rank flows by how much their measured bandwidths violate their respective fair rates. In other examples, the flow ranking process can consider other parameters inspectable by the RP 271, including parameters such as class of service of the flow.

Once the flows are prioritized, the first node maintains each currently allocated VOQ 241 corresponding to a flow prioritized as X or higher—Block 717. Further, the first node allocates a VOQ 241 corresponding to each received fair rate record flow prioritized as X or higher—Block 718. In some examples, the RP 271 allocates less than X ranked flows to a VOQ 241.

Returning to FIG. 3, after receiving the VOQ notification frame 400 and allocating up to X VOQs 241, the first node operates each allocated VOQ according to the corresponding recommended rate of flow until a deallocation condition obtains for the each allocated VOQ—Block 320. In the continuing example, the RP 271 periodically increases a particular VOQ's 241 rate when the RP 271 has not received a new fair rate record for a configurable duration. A CP 251 or the fabric 160 could fail to deliver fair rate records for a VOQ 241 corresponding to a given flow for a variety of reasons. In such a case, the RP 271 increases the rate of the particular VOQ until the rate becomes crosses a threshold (for example, 110% of the average ingress rate to the ingress LC 141) and then returns the traffic in the particular VOQ 241 to normal, non-shaped operation. This frees the particular VOQ 241 so that it is available to be allocated to other flows transiting the switch 130.

During operation, the allocated VOQs 241 are arbitrated with the regular queues/buffers and to the same link to fabric 160. This arbitration can be simple and only needs to be fair, with packet order within the flow being maintained. A given VOQ 241 may not immediately be serviced when it is allocated at time T, because other queues may hold older packets of the flow at time T The LC 141 waits for its queues to send out all packets older than T, before servicing the given VOQ 241. For each active VOQ 241, a unique T value recorded when the VOQ 241 was allocated is kept for this purpose.

Other Example Embodiments

FIG. 9 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), Fibre Channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain example embodiments, any of the processor 2010, the other elements of the computing machine 2000, or the various peripherals discussed herein may be integrated into a single device, for example, a system on chip (SOC), system on package (SOP), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Additionally, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

For example, a flow such as flow 180 can behave in a manner requiring excessive VOQ 241 allocations or teardowns. For example, a particularly bursty flow might severely violate a fair rate for a moment, triggering a VOQ 241 allocation; go silent, causing the VOQ 241 to age out; and then violate the fair rate again, triggering another VOQ 241 allocation. Each of these processes involves a transaction cost, such as a state transition. During a state transition, the RP 271 handling the VOQ 241 can behave inefficiently due to self-reconfiguration and internal re-queuing to prevent flow reordering. Therefore, excessive VOQ 241 state transitions effectively waste VOQs 241 and processing resources without doing useful work.

In some examples, the RP 271 records the number of VOQ 241 state transitions to determine whether a given flow should preserve its VOQ 241 when it would have otherwise aged out. Such a measurement can occur separately from measuring a flow's bandwidth, and can trigger an alert to an administrator or higher-level process to reconfigure other parameters, like the VOQ 241 aging parameters, to help reduce the likelihood of such state toggling. The measurement can also allow a flow to retain its VOQ 241 to avoid inefficient allocation and de-allocation. In some such examples, a per-flow counter increments when an RP 271 allocates or deallocates a flow. When this counter violates a programmed threshold, the flow would keep its next VOQ 241 allocation and not deallocate it until some other higher process deems it appropriate. Such a state transition counter can reset periodically or count over a sliding window to respond to activity over a particular day, or other programmable time interval.

In some examples, the RP 271 keeps track of the number of unallocated VOQs 241 it has remaining, and alters its VOQ 241 allocation behavior accordingly. For example, the RP 271 can report the number of its unallocated VOQs 241 to higher level processes or the administrator. In one example, the RP 271 reports a count of the number of available VOQs 241, along with a set of programmable thresholds. The thresholds can specify three regimes: Green (plenty of free VOQs 241), Yellow (starting to run out of VOQs 241, so begin tightening VOQ 241 allocation), and Red (very few unallocated VOQs 241 remaining, so begin taking severe action). In the Green regime, the RP 271 assigns VOQs 241 to flows that receive a valid fair rate, and have traversed the device recently. In the Yellow regime, the RP 271 assigns VOQs 241 only to flows that violate their fair rates by some margin, and uses more aggressive aging timer parameters. In the Red regime, the RP 271 ranks flows that are requested to enter a VOQ 241 according to how badly out of profile their behavior is, and the prioritizes the flows to receive VOQs 241. For the flows that don't receive VOQs 241, conventional measures, such as PAUSE and PFC, are used to preserve the lossless quality of the network while maintaining performance that is perhaps suboptimal but acceptable.

In other examples, the assembly 130 might choose to load balance flows between equal-cost paths to use the available VOQ 241 resources more efficiently. Either or both of the assembly 130 and individual RPs 271 can report VOQ 241 availability to a software defined network (SDN) controller or administrator. If a switch is in a situation where its VOQ 241 resources are running low, the SDN controller can move some problematic flows to switches with more VOQ 241 resources.

Figure 8:
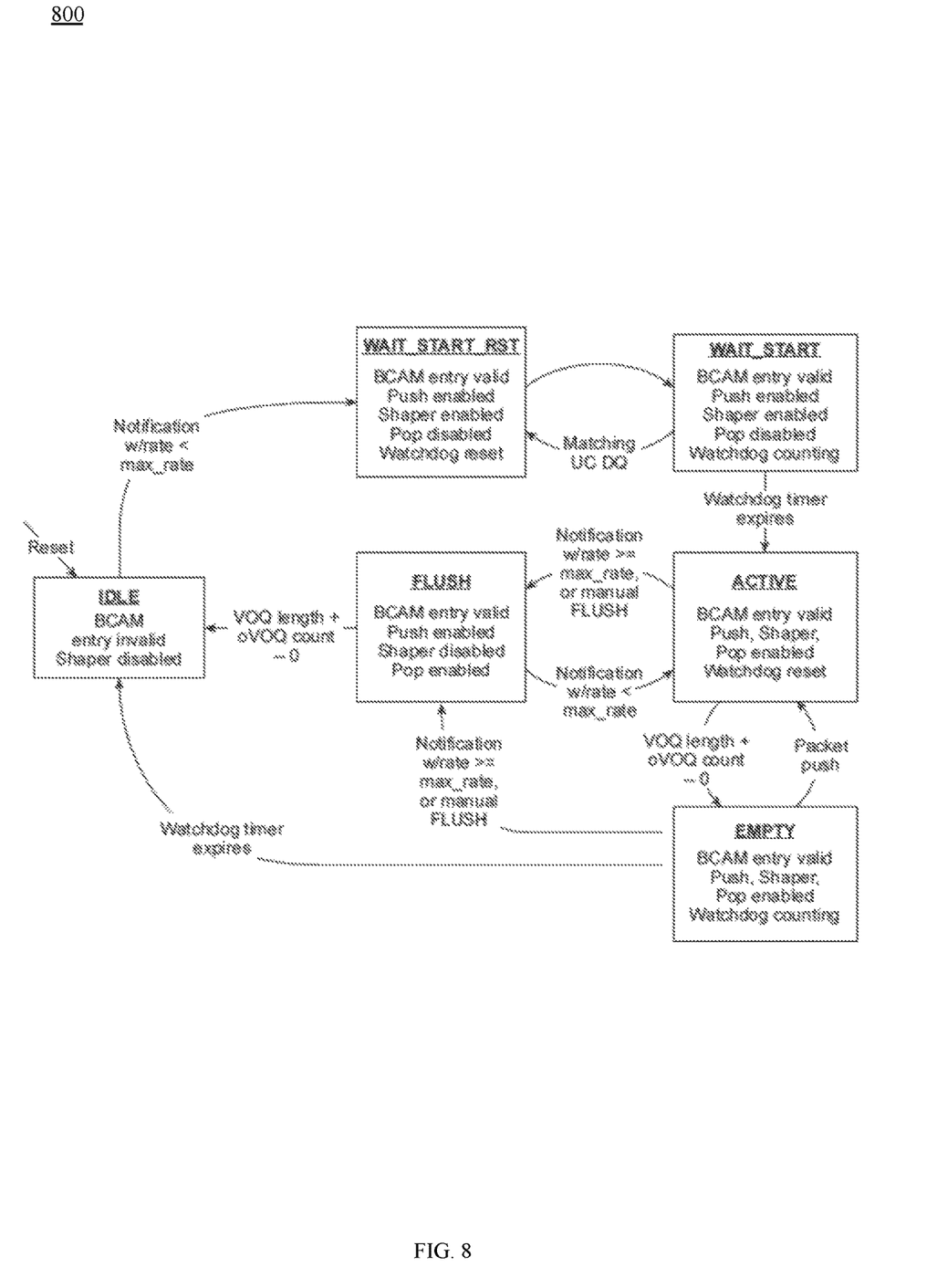
FIG. 8 is a state machine diagram depicting methods to manage a reaction point (RP) process of a VOQ, in accordance with certain examples of the technology disclosed herein.

Referring to FIG. 8, and continuing to refer to prior figures for context, in some example implementations of an RP 271 a state machine 800 can be used to facilitate VOQ 241 allocation and deallocation. Such a state machine 800 relies on a watchdog timer that snoops the packets through the ingress LC's 141 output, to determine whether the LC 141 can transition traffic to and from a the particular VOQ 241 operated by the state machine 800.

Although specific embodiments have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

We claim:

1. A method, comprising:
   in a first node of a packet switched network, the first node transmitting at least one flow of protocol data units of the network to at least one output context of one of a plurality of second nodes of the network, the first node comprising a defined quantity (X) of virtual output queues (VOQs):
      receiving, from at least one of the second nodes, at least one fair rate record, each fair rate record corresponding to a particular second node output context and describing a recommended rate of flow to the particular output context;
      allocating up to X of the VOQs among i) flows corresponding to currently allocated VOQs, and ii) the flows corresponding to the received fair rate records; and
      operating each allocated VOQ according to the corresponding recommended rate of flow, wherein operating each allocated VOQ further comprises modifying a transmission rate of a particular allocated VOQ until a deallocation condition obtains for each allocated VOQ.

2. The method of claim 1, wherein allocating up to X of the VOQs comprises:
   prioritizing the flows corresponding to each currently allocated VOQ and each received fair rate record;
   maintaining each currently allocated VOQ corresponding to a flow prioritized as X or higher; and
   allocating a VOQ corresponding to each received fair rate record flow prioritized as X or higher.

3. The method of claim 1,
   wherein operating each allocated VOQ comprises periodically increasing the transmission rate of a particular allocated VOQ until the deallocation condition obtains for each allocated VOQ, and
   wherein the deallocation condition for the particular VOQ obtains upon the transmission rate for the particular VOQ exceeding a predetermined threshold.

4. The method of claim 1, further comprising determining, by the first node, a reception rate for each flow received by the first node,
   wherein allocating a VOQ to a particular flow comprises:
      comparing the determined reception rate for the particular flow to the recommended rate for the particular flow; and
      allocating a VOQ to the particular flow only if the recommended rate exceeds the determined reception rate by a second predetermined threshold.

5. The method of claim 1, wherein the fair rate record is received in an IEEE 802.1p tagged Ethernet frame.

6. The method of claim 1,
   wherein the fair rate record is included in a protocol data unit (PDU) comprising a plurality of fair rate records, the PDU addressed to a plurality of nodes of the network including the first node;
   the method further comprising identifying, by the first node, each flow received by the first node, and
   wherein allocating a VOQ to a particular flow further comprises allocating a VOQ to a particular flow only if the particular flow is a flow identified as being received by the first node.

7. A computer program product, comprising:
   a non-transitory computer-readable storage device having computer-executable program instructions embodied thereon that when executed by a computer cause the computer to manage virtual output queues (VOQs), the computer-executable program instructions comprising computer-executable instructions to:
      in a first node of a packet switched network, the first node transmitting at least one flow of protocol data units of the network to at least one output context of one of a plurality of second nodes of the network, the first node comprising a defined quantity (X) of virtual output queues (VOQs):
         receive, from at least one of the second nodes, at least one fair rate record, each fair rate record corresponding to a particular second node output context and describing a recommended rate of flow to the particular output context;

allocate up to X of the VOQs among flows corresponding to currently allocated VOQs and flows corresponding to the received fair records; and operate each allocated VOQ according to the corresponding recommended rate of flow until a deallocation condition obtains for the each allocated VOQ, wherein operating each allocated VOQ further comprises modifying a transmission rate of a particular allocated VOQ until a deallocation condition obtains for each allocated VOQ.

8. The computer program product of claim 7, wherein allocation and operation of the VOQs is implemented in silicon within each first node.

9. The computer program product of claim 7, wherein allocating up to X of the VOQs comprises:
prioritizing the flows corresponding to each currently allocated VOQ and each received fair rate record;
maintaining each currently allocated VOQ corresponding to a flow prioritized as X or higher; and
allocating a VOQ corresponding to each received fair rate record flow prioritized as X or higher.

10. The computer program product of claim 7,
wherein operating each allocated VOQ comprises periodically increasing the transmission rate from a particular allocated VOQ, and
wherein the deallocation condition for the particular VOQ obtains upon the transmission rate for particular VOQ exceeding a predetermined threshold.

11. The computer program product of claim 7,
further comprising determining, by the first node, a reception rate for each flow received by the first node, and
allocating a VOQ to a particular flow further comprises:
comparing the determined reception rate for the particular flow to the recommended rate for the particular flow, and
allocating a VOQ to the particular flow only if the recommended rate exceeds the determined reception rate by a second predetermined threshold.

12. The computer program product of claim 7, wherein the fair rate record is received in an IEEE 802.1p tagged Ethernet frame.

13. The computer program product of claim 7,
wherein the fair rate record in included in a protocol data unit (PDU) comprising a plurality of fair rate records, the PDU addressed to a plurality of nodes of the network including the first node;
further comprising identifying, by the first node, each flow received by the first node, and
allocating a VOQ to a particular flow further comprises allocating a VOQ to a particular flow only if the particular flow is a flow identified as being received by the first node.

14. A modular data communication equipment (DCE) assembly, comprising:
at least one fabric module; and
at least one first line card and at least one second line card, each line card in communication with each fabric module and in communication with each other line card via the at least one fabric module;
each first line card characterized by a plurality of output contexts and operative to:
send flows of protocol data units from the switching assembly and into a packet switched network via a particular one of the output contexts; and
periodically determine a fair rate to be applied to each flow entering the assembly via one or more of the second line cards and destined for each output context, and
communicate the determined fair rates to the at least one second line cards; and each second line card comprising a number X of virtual output queues (VOQs), wherein X is a defined quantity of VOQs and X is less than the plurality of output contexts, and each second line card operative to:
transmit at least one flow to at least one of the output contexts;
receive, from at least one of the first nodes, a fair rate record corresponding to a particular first node output context, each fair rate record describing a recommended a fair rate of flow to the corresponding output context;
allocate up to X of the VOQs among flows corresponding to currently allocated VOQs and flows corresponding to the received fair records; and
operate each allocated VOQ until a deallocation condition obtains for the each allocated VOQ, wherein operating each allocated VOQ further comprises modifying a transmission rate of a particular allocated VOQ until a deallocation condition obtains for each allocated VOQ.

15. The assembly of claim 14, wherein allocation and operation of the VOQs is implemented in silicon within each second line card.

16. The assembly of claim 14, wherein allocating comprises:
prioritizing the flows corresponding to each currently allocated VOQ and each received fair rate record;
maintaining each currently allocated VOQ corresponding to a flow prioritized as X or higher; and
allocating a VOQ corresponding to each received fair rate record flow prioritized as X or higher.

17. The assembly of claim 14,
wherein operating each allocated VOQ comprises periodically increasing the transmission rate from a particular allocated VOQ, and
wherein the deallocation condition for the particular VOQ obtains upon the transmission rate for particular VOQ exceeding a predetermined threshold.

18. The assembly of claim 14,
further comprising determining, by the first node, a reception rate for each flow received by the first node, and
allocating a VOQ to a particular flow further comprises:
comparing the determined reception rate for the particular flow to the recommended rate for the particular flow, and
allocating a VOQ to the particular flow only if the recommended rate exceeds the determined reception rate by a second predetermined threshold.

19. The assembly of claim 14,
wherein the fair rate record in included in a protocol data unit (PDU) comprising a plurality of fair rate records, the PDU addressed to a plurality of nodes of the network including the first node;
further comprising identifying, by the first node, each flow received by the first node, and allocating a VOQ to a particular flow further comprises allocating a VOQ to a particular flow only if the particular flow is a flow identified as being received by the first node.

* * * * *